(12) United States Patent
Ban et al.

(10) Patent No.: US 12,056,520 B2
(45) Date of Patent: Aug. 6, 2024

(54) GRAPH-BASED DIAGNOSTICS AND RECOVERY FOR CLOUD SYSTEM

(71) Applicant: SAP SE, Walldorf (DE)

(72) Inventors: Rui Ban, Xi'an (CN); Bowen Ren, Xi'an (CN); Yucheng Guo, Xi'an (CN); Jingyuan Li, Xi'an (CN); Jingtao Li, Xi'an (CN); Wenbin Zhao, Xi'an (CN); Yan Ke, Xi'an (CN); Li-Ping Sun, Xi'an (CN)

(73) Assignee: SAP SE, Walldorf (DE)

( * ) Notice: Subject to any disclaimer, the term of this patent is extended or adjusted under 35 U.S.C. 154(b) by 600 days.

(21) Appl. No.: 17/323,402

(22) Filed: May 18, 2021

(65) Prior Publication Data
US 2022/0374263 A1    Nov. 24, 2022

(51) Int. Cl.
  *G06F 9/44*     (2018.01)
  *G06F 9/48*     (2006.01)
  *G06N 3/08*     (2023.01)

(52) U.S. Cl.
  CPC .......... *G06F 9/4881* (2013.01); *G06N 3/08* (2013.01)

(58) Field of Classification Search
  CPC .................................................. G06F 9/4881
  USPC ........................................................ 718/103
  See application file for complete search history.

(56) References Cited

U.S. PATENT DOCUMENTS

| | | | |
|---|---|---|---|
| 2022/0066852 A1* | 3/2022 | Ramanujan | G06F 11/0793 |
| 2022/0147831 A1* | 5/2022 | Hoang | G06N 20/00 |

* cited by examiner

Primary Examiner — Timothy A Mudrick
(74) Attorney, Agent, or Firm — Fountainhead Law Group, PC

(57) ABSTRACT

Embodiments relate to diagnosis and recovery of cloud based systems. From an incident ticket, a dynamic diagnostics graph is generated visualizing a hierarchy (ancestor, child) of diagnostic jobs investigating the functioning cloud system. By indicating and checking job statuses, child jobs dependent on a skipped or failed job can be skipped according to a dynamic pruning technique—thereby trimming an entire branch. And, by running separate groups of diagnostic jobs in parallel across different nodes, the diagnostic process can be finished rapidly and efficiently. A diagnostic report includes the dynamic diagnostics graph. For system recovery, the dynamic diagnostic graph is analyzed to automatically provide one or more appropriate Recommended Actions (RAs) resolving cloud system problem(s) revealed by diagnostic efforts. Those appropriate RAs may be provided by performing machine learning (e.g., referencing a neural network) with a model trained from historical cloud diagnostic and recovery activity.

11 Claims, 14 Drawing Sheets

GRAPH-BASED DIAGNOSTICS AND RECOVERY FOR CLOUD SYSTEM

BACKGROUND

Unless otherwise indicated herein, the approaches described in this section are not prior art to the claims in this application and are not admitted to be prior art by inclusion in this section.

The advent of high communications bandwidth and rapid data handling, allows software services to be deployed on cloud systems at remote servers. Cloud systems typically comprise various components, each of which is dependent on other components and/or services.

As cloud systems evolve in complexity, the number of components grow, and so does the knowledge and effort to perform diagnostic activities. Moreover, a minimum time to respond to incidents occurring on a cloud system, is generally prescribed by a Service Level Agreement (SLA), heightening the need for targeted and efficient diagnostic activities.

SUMMARY

Embodiments relate to diagnosis and recovery for cloud based systems. For diagnosis, an incident ticket is received as input. From that ticket, a dynamic diagnostics graph is generated visualizing a hierarchy (ancestor, child) of diagnostic jobs that are investigating the functioning cloud system. By indicating and checking job statuses, child jobs dependent on a skipped or failed job can be skipped according to a dynamic pruning technique—thereby trimming an entire branch. And, by running separate groups of diagnostic jobs in parallel across different nodes, the diagnostic process can be finished rapidly and efficiently. A diagnostic report is generated which includes the dynamic diagnostics graph.

For system recovery efforts, the diagnostic report is received as input. The dynamic diagnostic graph is analyzed to automatically provide one or more appropriate Recommended Actions (RAs) resolving cloud system problem(s) revealed by diagnostic efforts. Those appropriate RAs may be provided by performing machine learning (e.g., referencing a neural network) with a model trained from historical cloud diagnostic and recovery activity.

The following detailed description and accompanying drawings provide a better understanding of the nature and advantages of various embodiments.

DETAILED DESCRIPTION

Described herein are methods and apparatuses that implement diagnostic and recovery activities for cloud systems. In the following description, for purposes of explanation, numerous examples and specific details are set forth in order to provide a thorough understanding of embodiments according to the present invention. It will be evident, however, to one skilled in the art that embodiments as defined by the claims may include some or all of the features in these examples alone or in combination with other features described below, and may further include modifications and equivalents of the features and concepts described herein.

Figure 1:
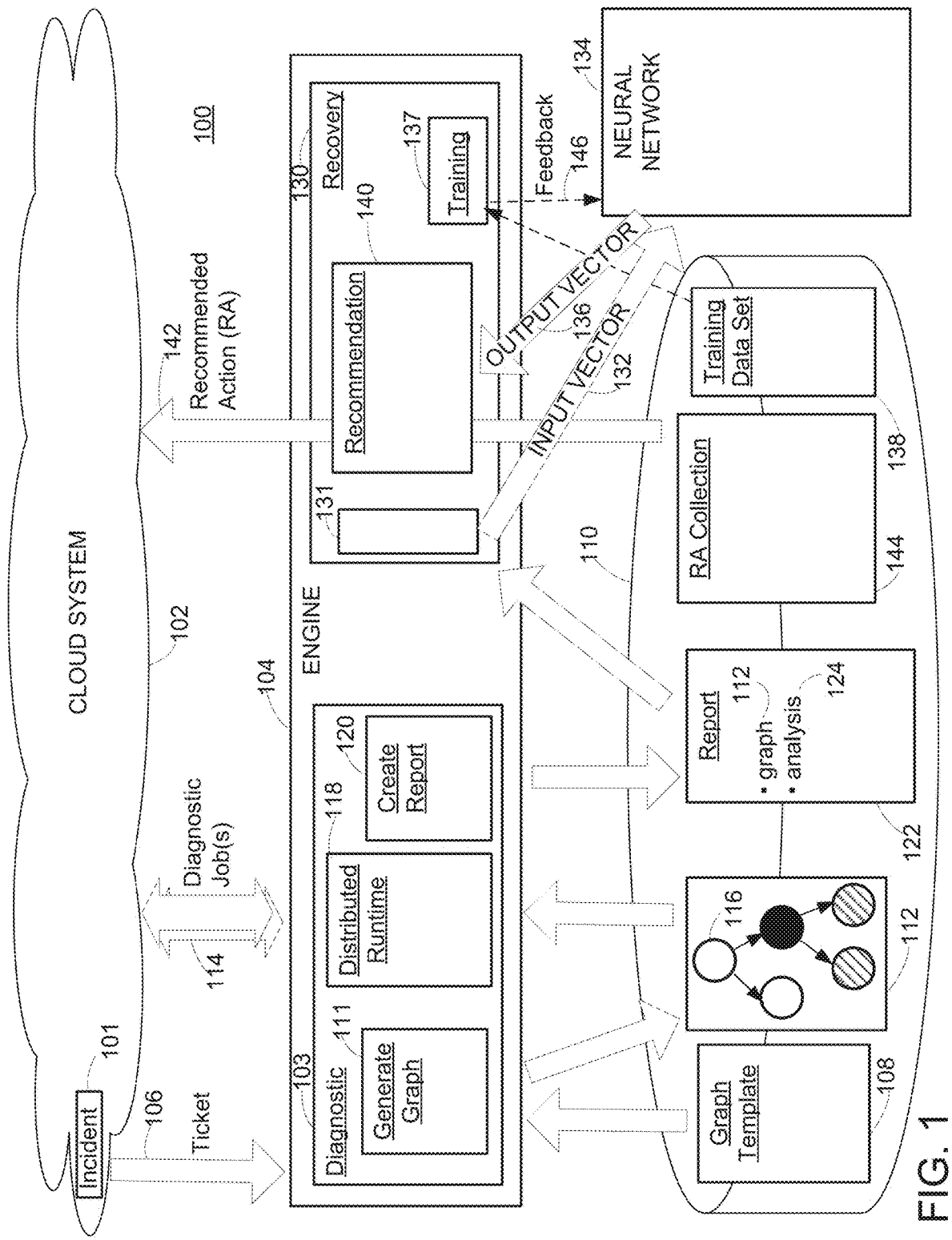
FIG. 1 shows a simplified diagram of a system according to an embodiment.

FIG. 1 shows a simplified view of an example system that is configured to implement diagnostic activities according to an embodiment. Specifically, system 100 comprises a cloud system 102 that is experiencing an incident 101 and hence is the subject of diagnostic and recovery efforts according to embodiments.

Diagnostic element 103 of diagnostic and recovery engine 104 receives an incident ticket 106 indicating the incident occurring with the cloud system. This diagnostic ticket may be communicated to the engine via an issue tracking system.

Based upon characteristics of the incident ticket, the engine references a graph template 108 that is stored in non-transitory computer readable storage medium 110. Using that graph template, the engine generates 111 and stores a graph representation 112 indicating a status of diagnostic jobs 114 that are being conducted on the cloud system.

In particular, the graph representation comprises nodes 116 that are organized in a hierarchical structure, with each node reflecting a diagnostic job. The nodes may be labeled (e.g., by color, hatching) to reflect the status (e.g., successful, failed, stalled) of the particular diagnostic job.

While FIG. 1 shows the graph representation in tree form, this is not required. Other types of graph representations could be used, for example graph representations exhibiting a many-to-many structure.

In view of job status information that is input as part of the graph representation, a distributed runtime 118 may function to improve the efficiency of execution of the diagnostic jobs. According to a dynamic pruning process, jobs dependent on failed and skipped jobs are marked skipped, while jobs dependent on running or stalled ones are stalled.

The distributed runtime may then group certain jobs together based upon their common execution dependency (e.g., they are written in the same programming language, using the same libraries and packages). Jobs belonging to a same group are run sequentially in a same container.

Different groups of jobs (e.g., those running in distinct containers and nodes) are able to be executed in parallel. Such parallel execution of job subsets in the dynamic graph, enhances the speed of diagnostic efforts.

Based upon the result of the (efficient) execution of diagnostic jobs by the distributed runtime, the engine creates

120 and stores a diagnostic report 122. That report may include the graph representation itself, as well as analysis 124 of the results of executing the diagnostic jobs.

A cloud system recovery capability is now discussed. In particular, the recovery element 130 of the diagnostic and recovery engine receives the report as input.

An encoder 131 of the engine processes the report to encode an input vector 132. That vector is input to a neural network 134 and processed to create an output vector 136.

In particular, the neural network is trained by a training procedure 137 referencing a training set 138 that reflects historical successful cloud system diagnostic and recovery efforts. The training set may further comprise experimental data resulting from chaos engineering. Accordingly, the output vector indicates a recovery strategy for address the incident that has been diagnosed.

The recommendation component 140 receives the output vector from the neural network. Based upon processing of that output vector, the recommendation component selects a recommended action 142 from a stored collection 144, and causes that recommended action to be executed on the cloud system.

An RA comprises an ordered list of standard procedures maintained by a support team. The RA defines the step-by-step instructions to resolve specific kinds of incidents.

In this manner, the cloud system can be aided to recover from the problem that was previously revealed by diagnostic efforts. And, the success of the recovery can be employed by the training procedure to provide feedback 146, improving neural network accuracy.

Figure 2:
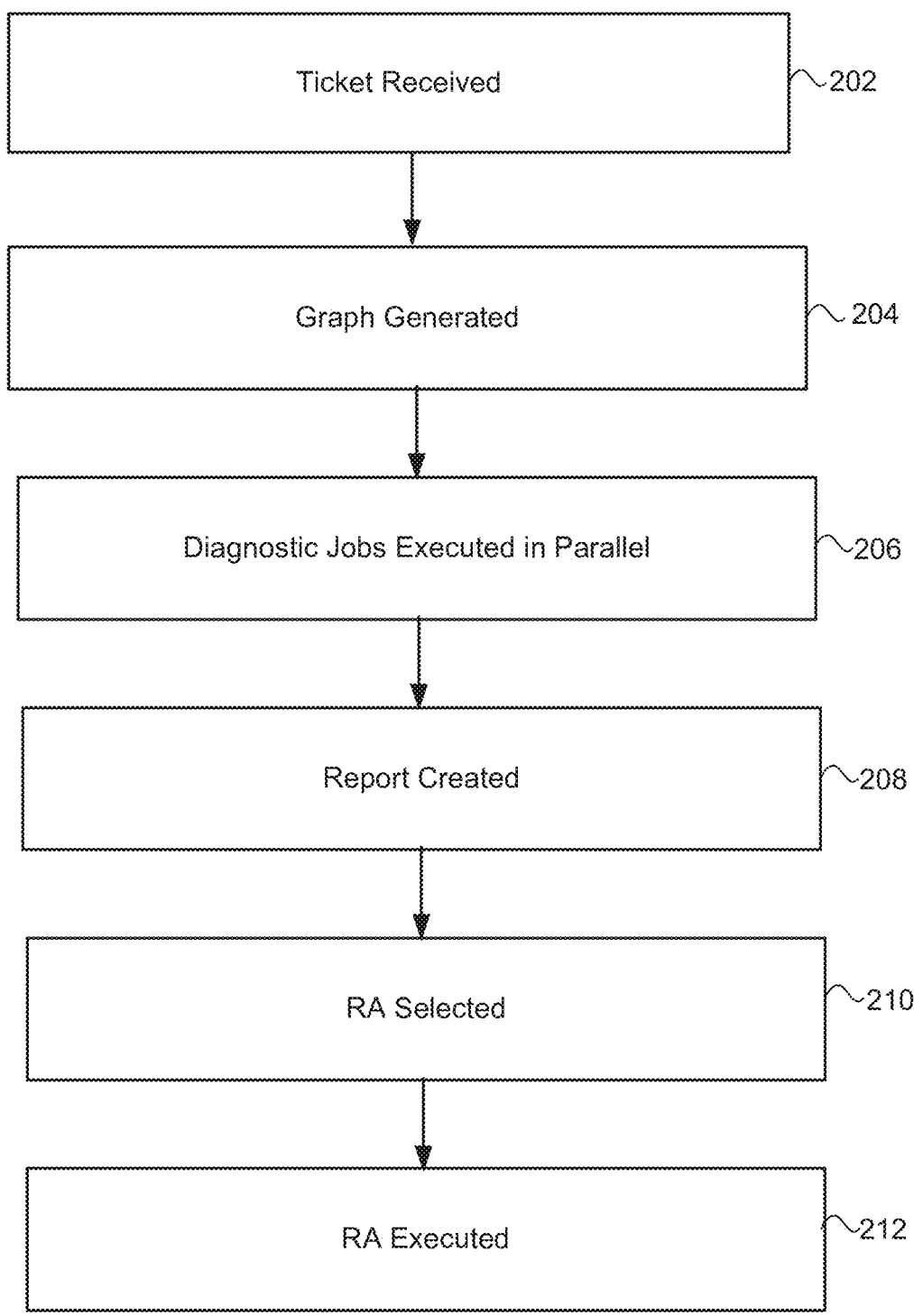
FIG. 2 shows a simplified flow diagram of a method according to an embodiment.

FIG. 2 is a flow diagram of a method 200 according to an embodiment. At 202, an incident ticket is received.

At 204, the incident ticket is processed to generate a graph representation. At 206, diagnostic jobs are executed in parallel according to the graph representation.

At 208, a diagnostic report is created.

At 210, a recommended action is selected from the report based upon machine learning. At 212, the recommended action is executed.

Systems and methods for workload routing according to embodiments, may offer one or more benefits. On the system diagnosis front, embodiments may speed up diagnosis of cloud system incidents.

In particular, diagnostic procedures may be orchestrated into a Directed Acyclic Graph (DAG) and executed in a distributed way. With a combination of dynamic pruning (trimming entire branches), and containerization (creating separate job groups for execution in parallel), the entire process of diagnosing a cloud system may be accelerated.

On the recovery front, embodiments may reduce the cloud system down time by maximizing RA decision speed and minimizing human intervention. The machine learning can leverage knowledge gained from past diagnostic/recovery efforts and/or chaos engineering to enhance the accuracy of RA selection.

Further details regarding performing diagnostic and recovery activities for cloud systems according to various embodiments, are now provided in connection with the following example.

EXAMPLE

The SAP DATA INTELLIGENCE CLOUD, is a cloud system available from SAP SE of Walldorf, Germany. That cloud system utilizes a Central Instance (CI) Server and a Build Pack Manager. The following exemplary embodiment is responsible for performing diagnostic activity on the SAP DATA INTELLIGENCE CLOUD system.

This exemplary embodiment provides a diagnostic system performing rapid diagnosis for SAP DATA INTELLIGENCE CLOUD, by leveraging technologies such as automated orchestration, distributed computation, and dynamic pruning. The diagnostics system takes as the input an incident ticket created by either customer or support team.

The diagnostics system analyses the incident ticket. The diagnostics system then generates and executes a dynamic diagnostic graph, predefined for the particular service version and type of the involved instance. The dynamic diagnostic graph is a set of diagnostic jobs with pre-defined dependencies.

The dynamic diagnostic graph is generated by a diagnosis manager based on a certain version of a graph template, and instance metadata such as service region and connection information. Since different sets of diagnostic jobs correspond to different versions of service, a mapping between service versions and graph templates is maintained by the diagnosis manager as well.

Each job is a piece of code able to be executed in a distributed runtime, which provides a distributed environment where diagnostic jobs are executed. Jobs independent to each other are executed in parallel, while others follow the order of a dependency hierarchy.

Each job has 3 possible outcomes: succeeded, failed, and skipped. A job will be skipped if one of its ancestors fails or is skipped.

In a production system, there are possibly hundreds of jobs in a single diagnostic graph. Accordingly, the execution can be expedited significantly by parallel execution and dynamic pruning.

Then, the diagnostics system summarizes the result for further reference (by human and/or other analytical systems). As described in detail later below, in some embodiments the resulting report may be analyzed utilizing a neural network.

Figure 3:
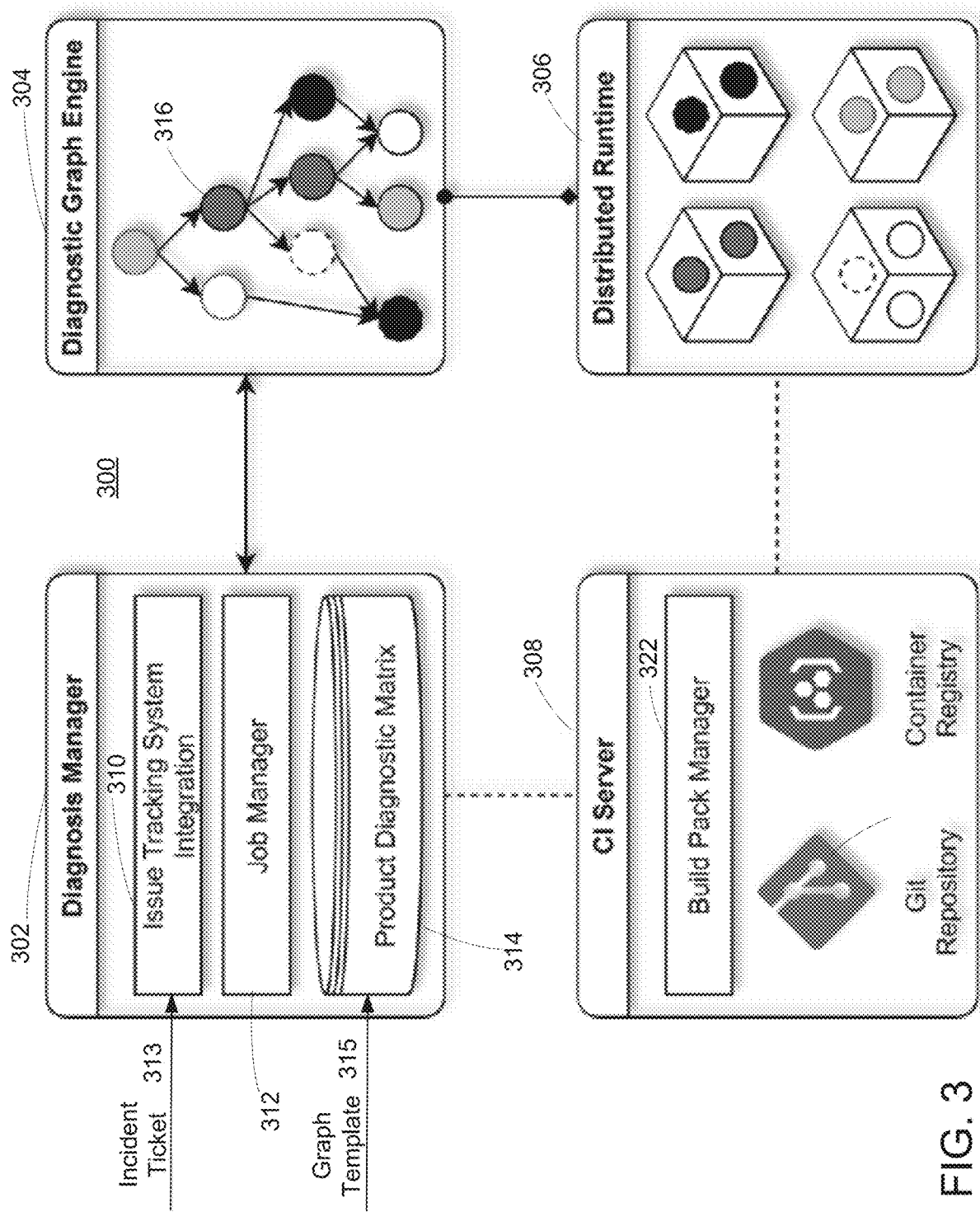
FIG. 3 shows a simplified view of a diagnostic architecture according to an embodiment.

FIG. 3 is a simplified view showing the overall architecture 300 of the diagnostic system according to this exemplar embodiment. Here, the example diagnostics system includes the Diagnosis Manager 302, the Diagnostic Graph Engine 304, and the Distributed Runtime 306.

Integration to the existing CI Server 308 is also shown in FIG. 3. In particular, the CI Server is integrated to serve as a code and image management hub.

The Diagnosis Manager is responsible for contacting the issue tracking system, and extracting the metadata from the concerned service instance. The diagnosis manager generates a dynamic diagnostic graph according to the graph template of its service version.

The Diagnostic Graph Engine consumes the diagnostic graph. The Diagnostic Graph Engine dispatches diagnostic jobs for execution in accordance with the dependency requirements between individual jobs.

Distributed Runtime is the component that coordinates the sandboxes for diagnostic jobs to be executed simultaneously.

In one embodiment, the Diagnosis Manager incorporates an adapter 310 to an Issue Tracking System. In that Issue Tracking System, user-reported and system-monitored tickets are created and stored.

The Diagnosis Manager may also incorporate a Job Manager 312. The Job Manager is responsible for defining diagnostic graphs and handling job execution results.

A general workflow is now described. First, the Diagnosis Manager extracts metadata from the associated incident ticket 313. Such metadata can include but is not limited to:
- service ID,
- service type,
- service version Next, the suitable diagnostic job template 315 is loaded from a Product Diagnostic Matrix 314. This is a database storing the mapping of (service types and service versions→diagnostic job templates).

Lastly, a diagnostic graph 316 is generated according to the template and instance metadata. The diagnostic graph is executed in the Distributed Runtime environment.

Figure 4:
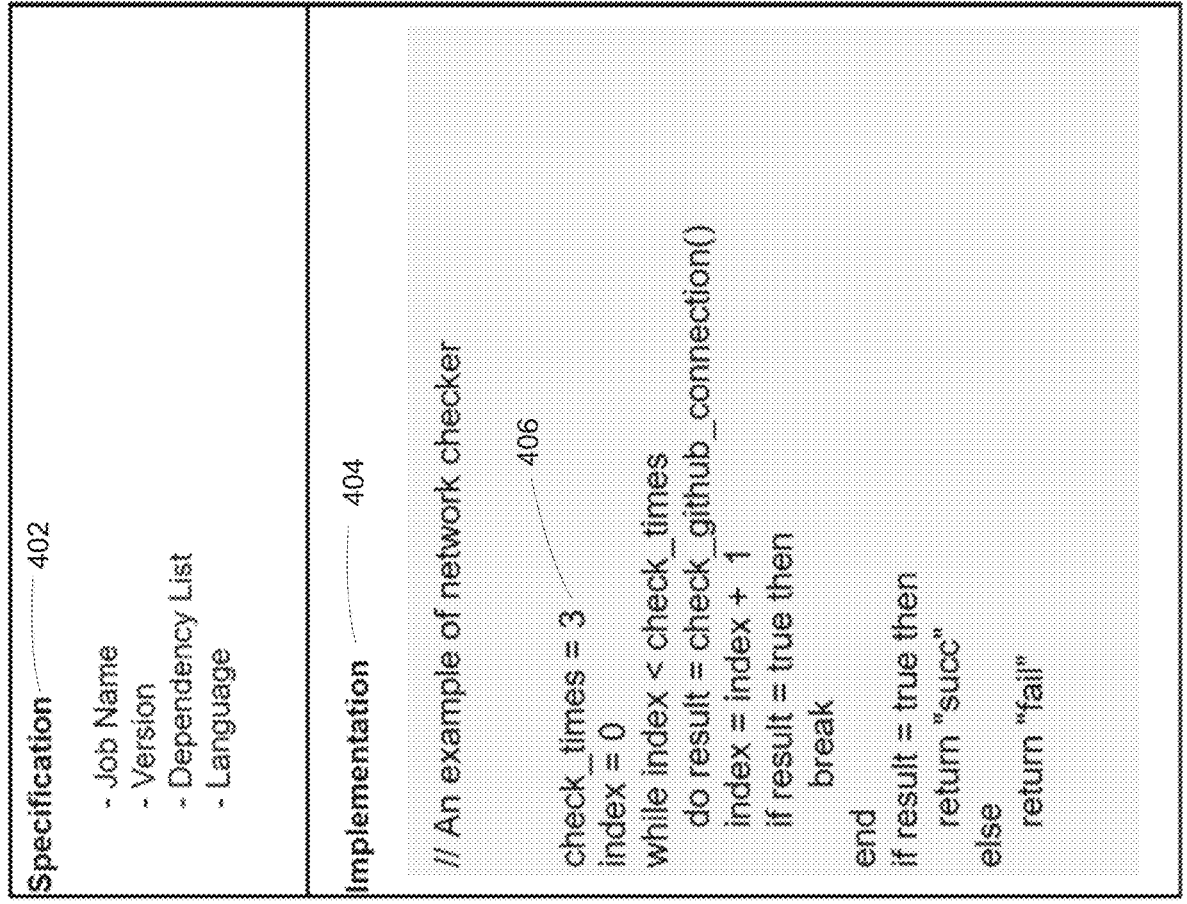
FIG. 4 shows sample pseudocode for a diagnostic job.

FIG. 4 shows pseudocode for an example of a diagnostic job 400 according to an exemplary embodiment. This diagnostic job comprises the following two parts.

In specification 402, attributes are defined. These attributes can include but are not limited to:
- job name,
- version, and
- dependencies.

The implementation 404 includes the source code 406 for the diagnostic job. Diagnostic job definitions are hosted in a version control system like Git (shown as 320 in FIG. 3).

A job template is a definition of a collection of versioned diagnostic jobs that are to be executed. To meet the dependency requirement, the Diagnosis Manager will recursively analyze the diagnostic jobs and their dependent ones, and dynamically load the corresponding definitions. As a result, a complete diagnostic graph is fully initialized from the graph template and extracted instance metadata.

As shown in the embodiment of FIG. 3, the Diagnostic Graph Engine 304 is introduced. This Diagnostic Graph Engine is configured to execute and track the diagnostic graphs generated by Diagnosis Manager.

Individual diagnostic jobs of the graph are created and dispatched to the Distributed Runtime for execution if they have no dependency, or if their dependent jobs are successfully finished.

A diagnostic job may have three resulting states: succeeded (finished), failed, and skipped. These are shown as 502 in FIG. 5. A job will be skipped if one of its parent jobs fails or is skipped.

The state of a diagnostic graph is determined after all the jobs in it are finished executing or skipped.

Figure 5:
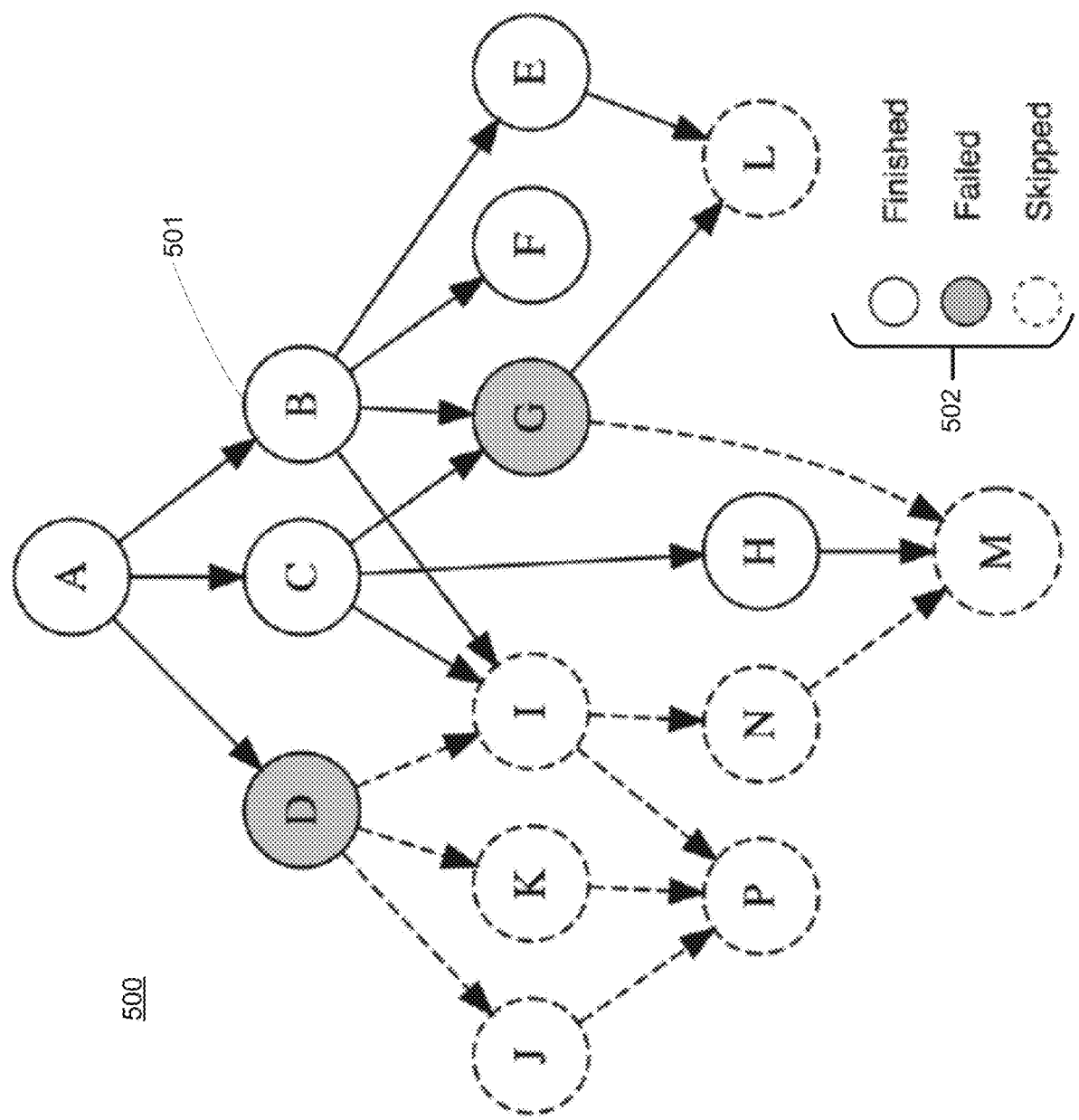
FIG. 5 shows a simplified view of an exemplary diagnostic graph.

FIG. 5 is an example of a dynamic diagnostic graph 500. Each node 501 represents a diagnostic job.

One job gets executed once all of its parents are finished. If one job fails or is skipped, all of its children jobs will be skipped.

In this example, jobs D and G have failed. This leads to their subsequent jobs J, K, I, P, N, H, L and M all being skipped.

Utilizing dynamic pruning and parallel execution of independent jobs according to embodiments, the execution time of this diagnostic graph could be minimized.

Figure 6:
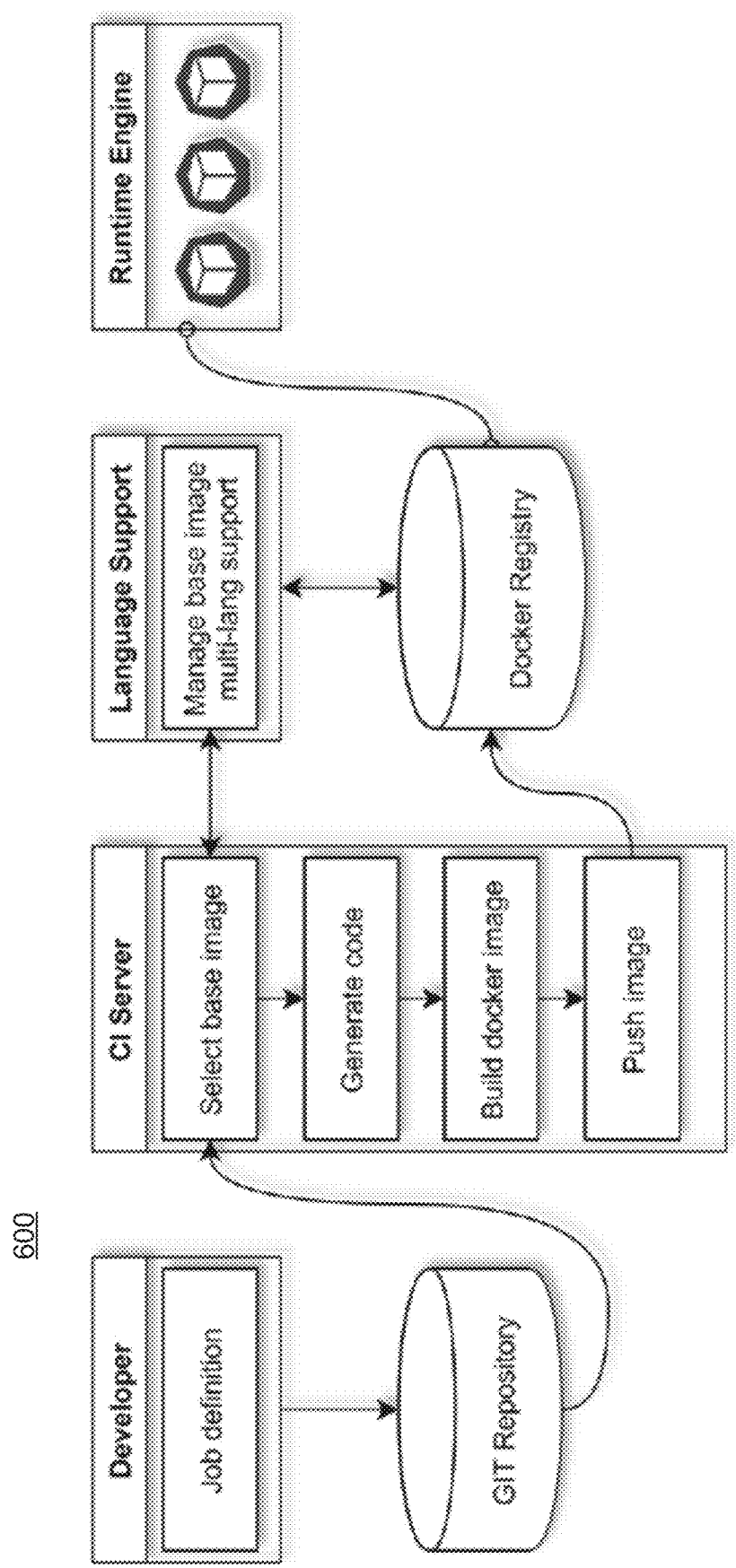
FIG. 6 illustrates a simplified view of distributed runtime and a server according to an exemplary embodiment.

FIG. 6 shows a flow 600 illustrating how the images of diagnostic jobs are readied in advance, and then consumed by distributed runtime when needed. Specifically, FIG. 6 depicts how diagnostic jobs written in different programming languages, are managed before being executed in a parallel fashion.

Generally, creating or updating a job definition will trigger a continuous integration system to build a new or newer version of the container image. A tag is tracked in the job template. The job definition is pushed to Docker Registry. From there, the Distributed Runtime can later fetch the images when diagnostic jobs come in.

According to this exemplary embodiment, the system introduces Distributed Runtime Engine. This Distributed Runtime Engine provides an orchestration of distributed sandboxes for executing diagnostic jobs.

The Build Pack Manager available from SAP (322 in FIG. 3) has multi-language capability. Utilizing that Build Pack Manager's multi-language support, the particular language in which the diagnostic job is programmed, is transparent to the Distributed Runtime.

When receiving diagnostic jobs from the Diagnostic Graph Engine, the Distributed Runtime rapidly fetches pre-built images from the Dockery Registry. The Distributed Runtime instantiates containers accordingly (e.g., utilizing KUBERNETES), where each job is mapped to a pod.

After the diagnostic graph finishes running, the Diagnosis Manager will collect the results of diagnostic jobs and generate a summary report. This report may include a visualization of the dynamic diagnostic graph (e.g., as shown in FIG. 5).

The summary report can in turn be analyzed by human or by other systems, in order to determine the best solution to resolve the incident or error.

In particular, certain embodiments may receive the diagnostics report and analyze same with a neural network. Such a recovery system may recommend actions for incidents (including an embedded executer to perform the actions automatically).

A training system with a built-in chaos engineering system may initialize and improve accuracy of the neural network. The Neural Network will grow smarter with new training data fed to it over time.

As a whole, this recovery system could reduce system recovery time by maximizing RA decision speed and minimizing human intervention. Specifically, exemplary embodiments provide a fast recovery system for SAP DATA INTELLIGENCE CLOUD by leveraging techniques and disciplines such as artificial neural network and chaos engineering.

The recovery system takes as input, the diagnostic report from the diagnosis system. The recovery system produces as output, an RA for automatic system recovery.

The neural network is used for RA recommendation. The chaos engineering is used to train the neural network.

Embodiments of recovery systems feature a two-layer neural network. The input to the neural network is a vector encoded from the diagnostic report. The output from the neural network is a one-hot encoded vector representing the RA identifier.

In order to gather sufficient initial training data, the recovery system adopts the concepts of chaos engineering to inject (into a working system inside a sandbox) random faults whose corresponding RAs are already known. Then, the recovery system executes the diagnostic jobs and retrieves the diagnostic reports. This collection of diagnostic reports and their corresponding RAs, constitute the initial training set for the neural network.

Later on, human efforts are only involved when the recommended RA fails to resolve a fault. As a consequence, the incorrect RA is corrected and added to the training set to further improve the recommendation accuracy.

Figure 7:
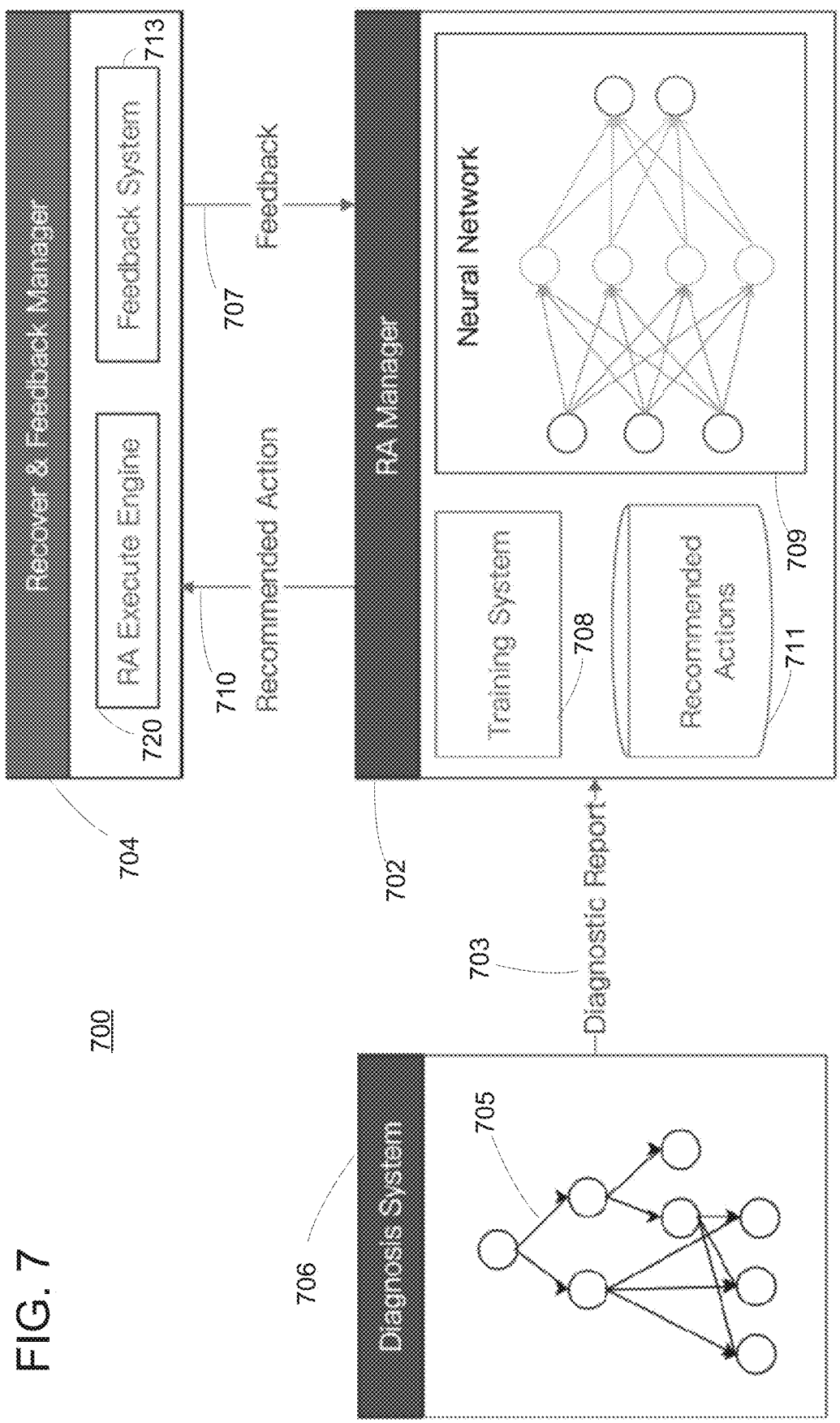
FIG. 7 shows a simplified block diagram of an exemplary diagnostics architecture including a neural network.

FIG. 7 is a simplified view illustrating a recovery system architecture according to an exemplary embodiment. This recovery system 700 comprises the RA Manger 702 and the Recovery & Feedback Manager 704.

The RA Manager consumes the output (e.g., diagnostic report 703 including graph 705) of the Diagnosis System 706. The RA Manager also consumes the feedback output 707 of the Recovery & Feedback Manager.

In one embodiment, the RA Manager incorporates an artificial neural network 709 as well as a training system 708 generating RAs 710 based upon the input diagnostic report.

An RA comprises an ordered list of standard procedures maintained by a support team. The RA defines the step-by-step instructions to resolve specific kinds of incidents. A collection of available RAs is stored in a database 711 in the RA Manager for training and reference purposes.

In one embodiment, the Recovery & Feedback Manager tracks and perform RAs generated by the neural network. A Feedback System 713 of the Recovery & Feedback Manager evaluates the result and feeds it back to RA Manager.

Because an RA comprises a list of executable procedures, it can be executed by the RA Execute Engine 720 without human supervision.

After performing the RA, a new diagnostic procedure will be triggered to determine whether the incident has been resolved or not. If the evaluation result gathered and analyzed by the Feedback Manager indicates the problem persists, a human expert will be called in to handle the incident. After which, the correct RA will be in turn fed back to the RA Manager to improve the accuracy of the neural network.

Figure 8:
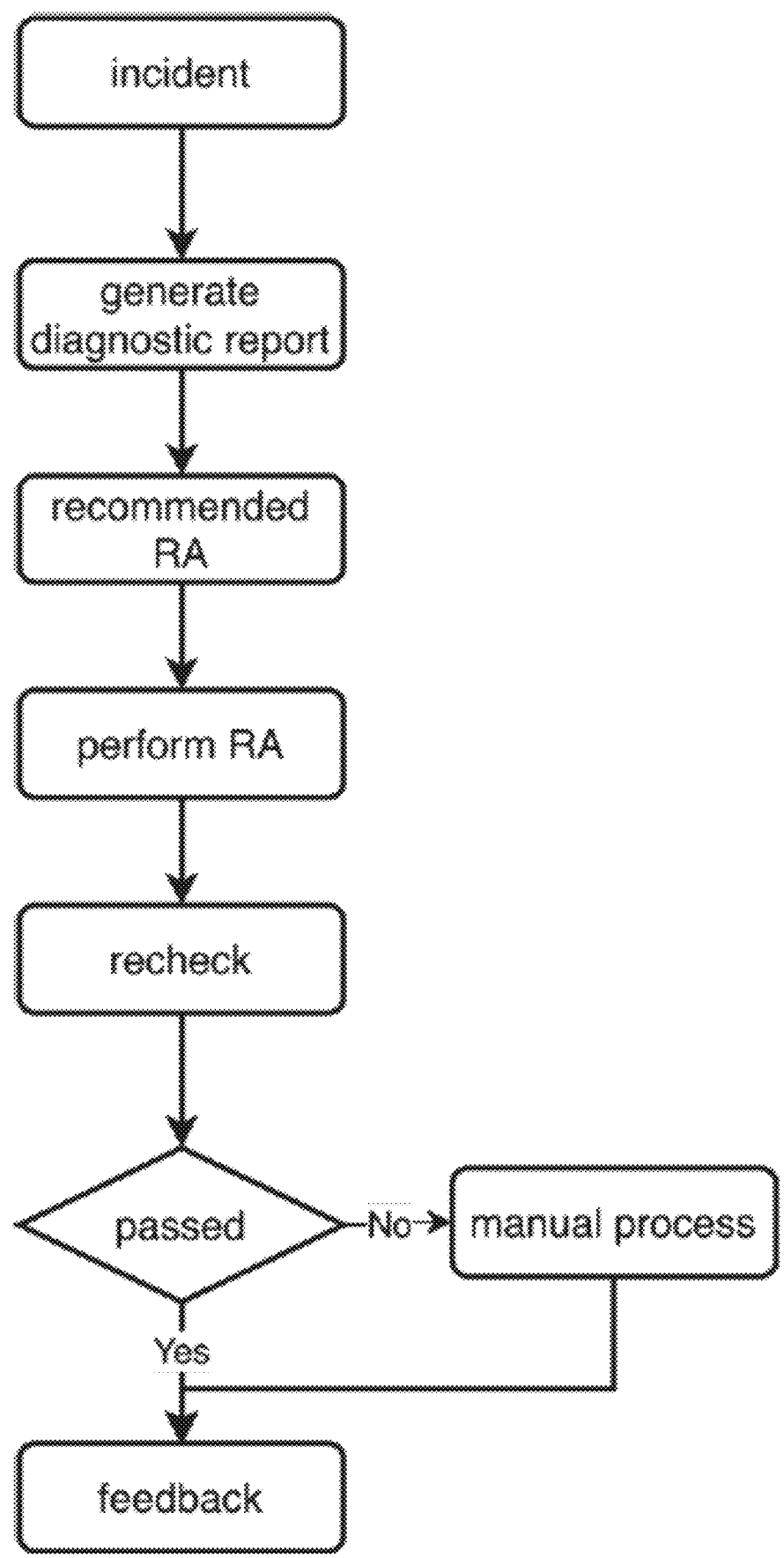
FIG. 8 shows a simplified diagram illustrating a service recovery flow.

FIG. 8 is a simplified diagram illustrating a flow of a service recovery process. The overall workflow of FIG. 8 includes the original incident and the corresponding recovery process.

When an incident happens, a ticket is created to track its status. Then, as described previously, the Diagnosis System will perform a set of diagnostic tasks and produce a diagnostic report according to the information provided by the ticket.

The recovery system analyzes the generated report to recommend action to be taken. After that, the RA is performed.

Then, the result of the RA on the cloud system is observed. This result is evaluated to see if any other manual operations are required. Finally, the correctness of the RA will be reinforced by the system to increase the prediction accuracy.

Figure 9:
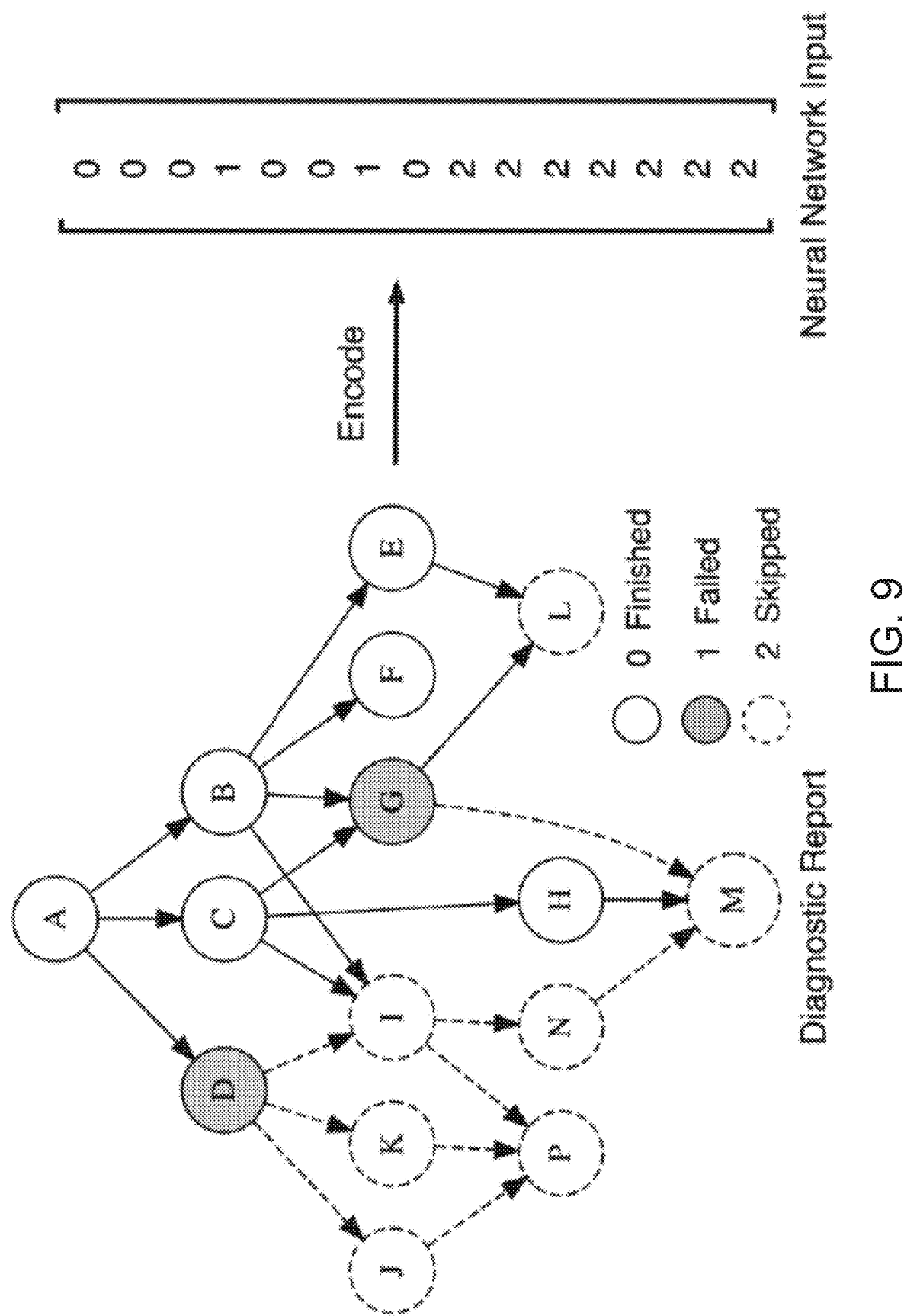
FIG. 9 is a simplified view illustrating neural network input encoding according to an exemplary embodiment.

FIG. 9 is a simplified illustration of a procedure to encode a diagnostic report into an input matrix for a neural network. The diagnostic report is essentially a directed acyclic graph.

The nodes of the graph represent diagnostic tasks of sequential task ids starting from 0. The diagnostic report is ultimately encoded into a vector whose indices are task ids and values are task execution results.

Figure 10:
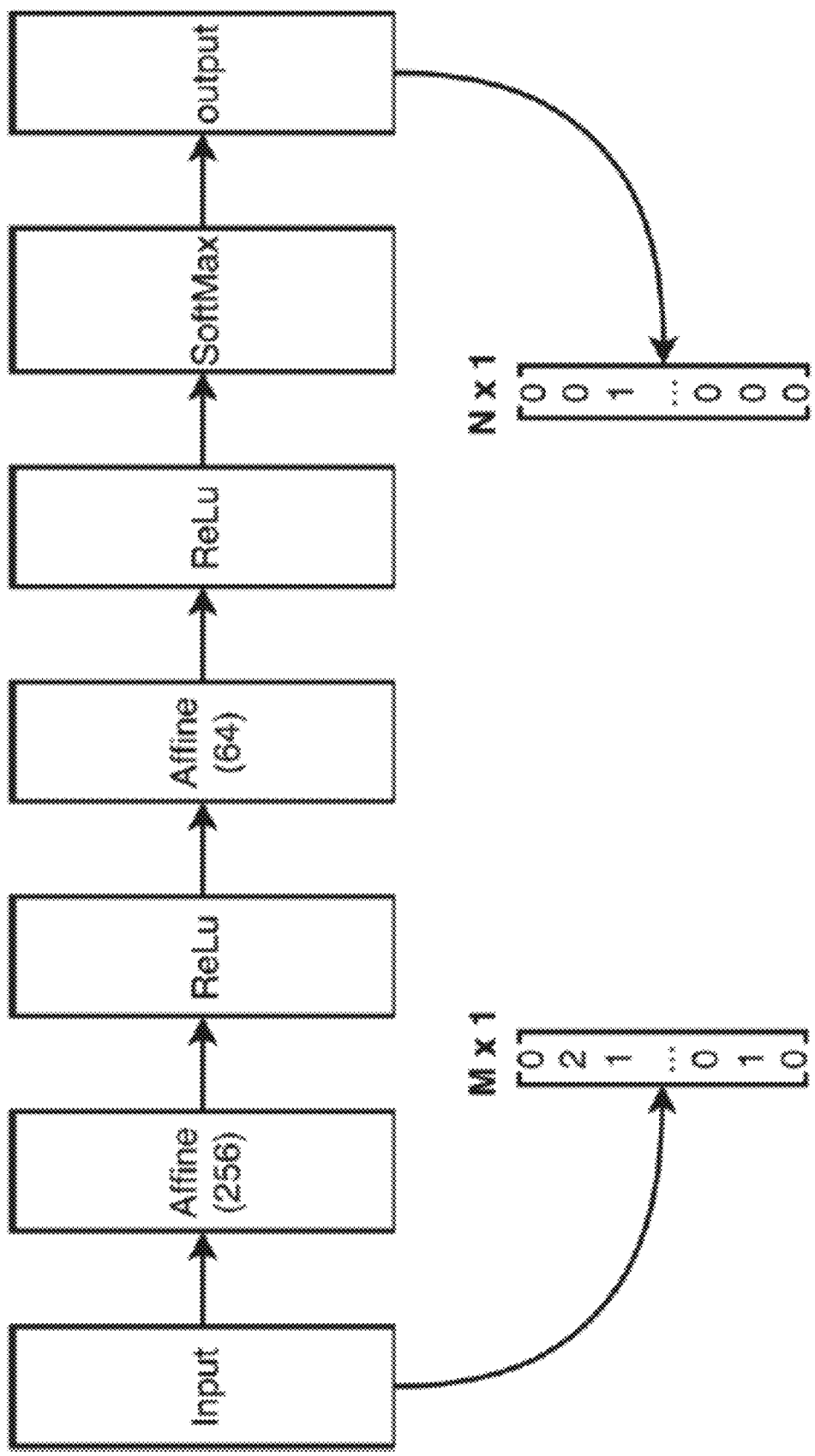
FIG. 10 shows a simplified view of a neural network structure.

FIG. 10 shows the neural network structure which is leveraged to recommend a RA from an incoming diagnostic report. As illustrated in the particular exemplary embodiment of FIG. 10, the neural network comprises two affine layers. The output of the neural network is a one-hot encoded vector, the index of whose row is of value one will be the RA id.

Figure 11:
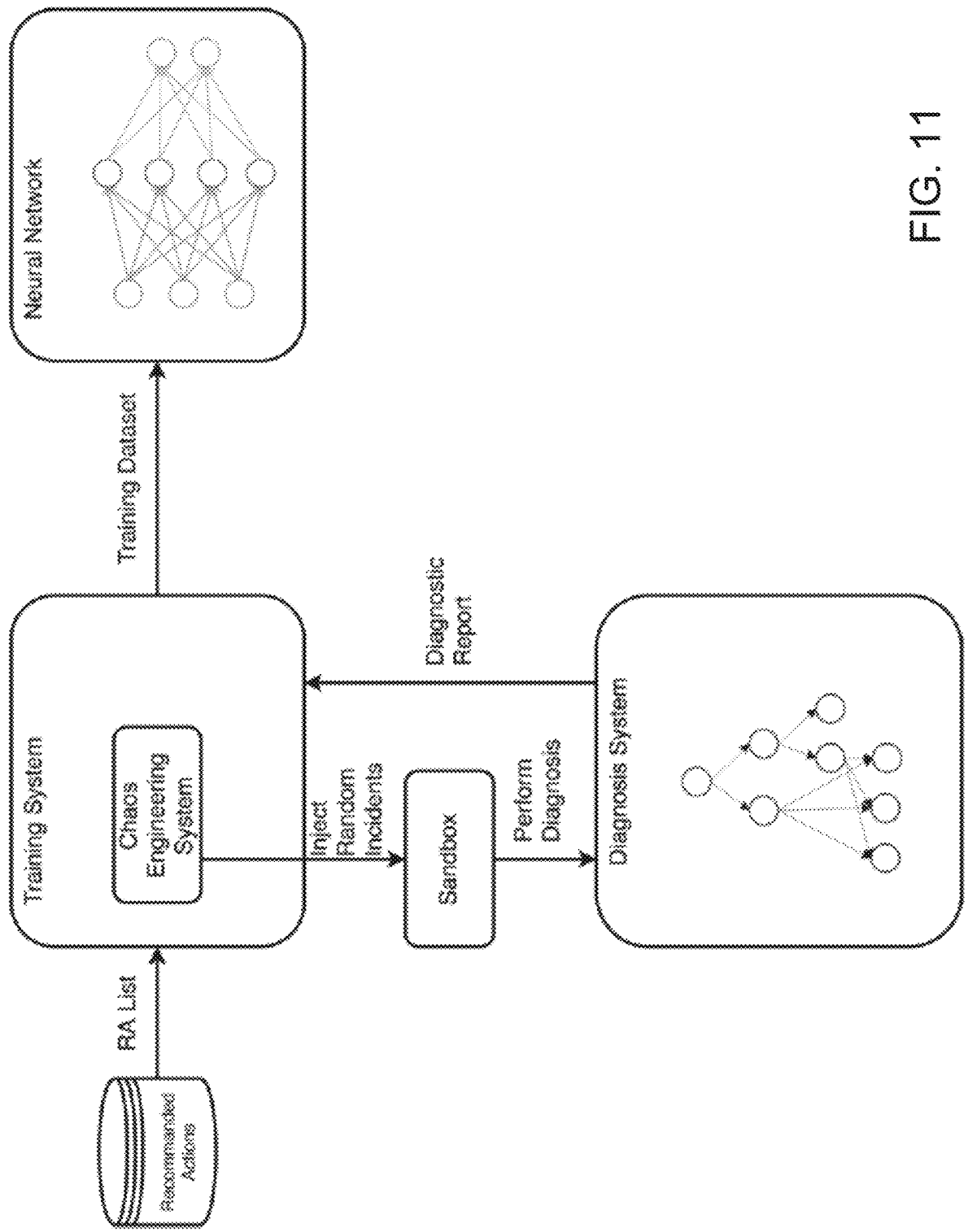
FIG. 11 shows a simplified view depicting training system interaction according to an exemplary embodiment.

FIG. 11 illustrates a process flow for gathering a dataset and training the neural network. The accuracy of the neural network is influenced by both the quantity and the quality of the training dataset. In this embodiment, a training system is dedicated to training the neural network.

Embodiments may rely upon chaos engineering in order to gather a massive dataset. More precisely, the chaos engineering system generates random known faults and injects them to a healthy system. The system knows the optimal RAs for these faults. By repeating this procedure, a set of diagnostic reports and corresponding RAs can be gathered to enrich the dataset for training the neural network.

Figure 12:
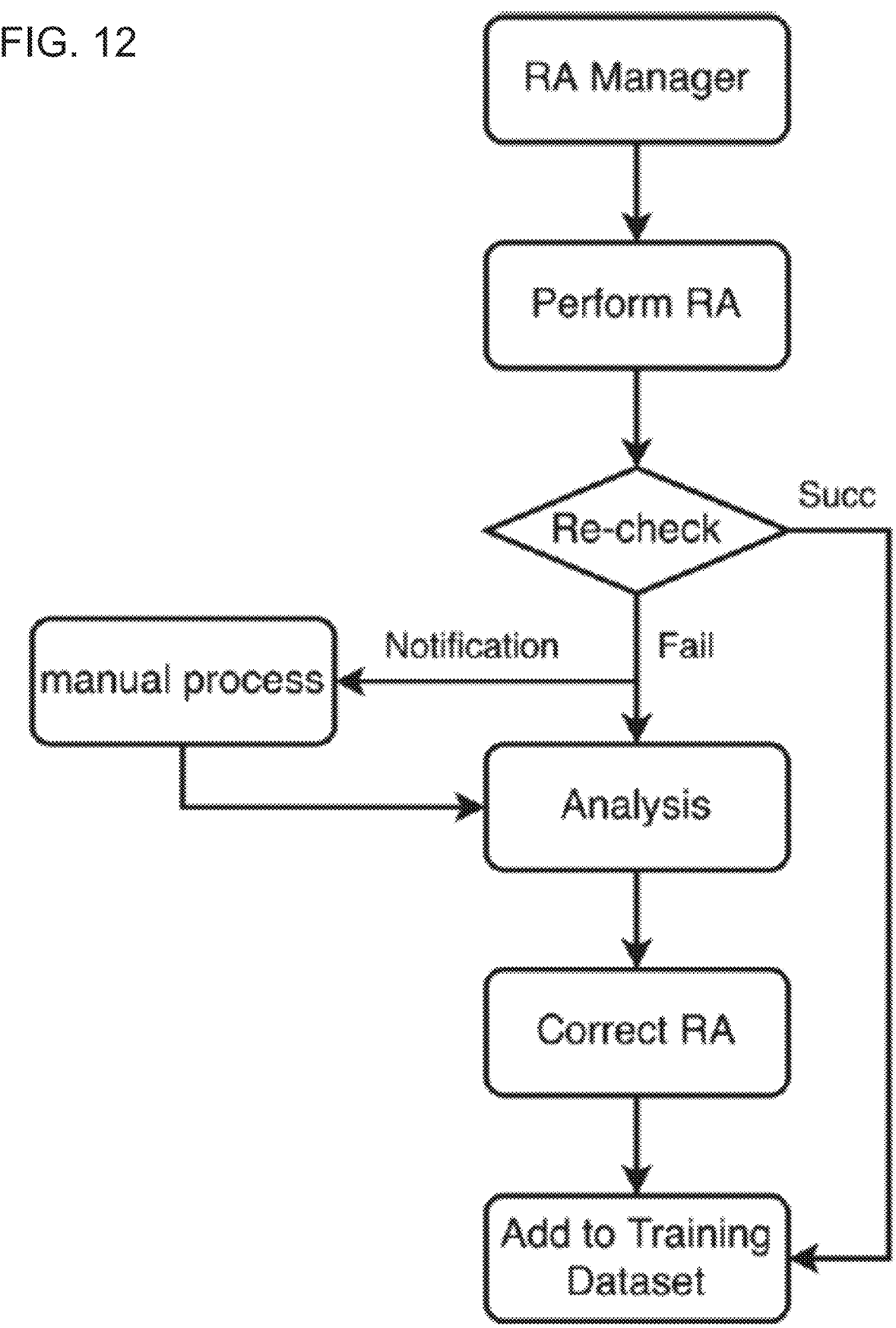
FIG. 12 shows a simplified diagram illustrating a feedback system workflow.

FIG. 12 illustrates an embodiment of a feedback process aimed at correcting inaccurate recommendation and improving recommendation accuracy. A re-check process is triggered after performing the RA to validate if the incident is resolved.

If not, human effort will be involved to analyze and correct the RA. Such manual analysis/correction effort will be added to the training dataset to improve recommendation accuracy.

Returning now to FIG. 1, there the particular embodiment is depicted with the engine responsible for cloud system recovery as being located outside of the database. However, this is not required.

Rather, alternative embodiments could leverage the processing power of an in-memory database engine (e.g., the in-memory database engine of the HANA in-memory database available from SAP SE), in order to perform various functions.

Figure 13:
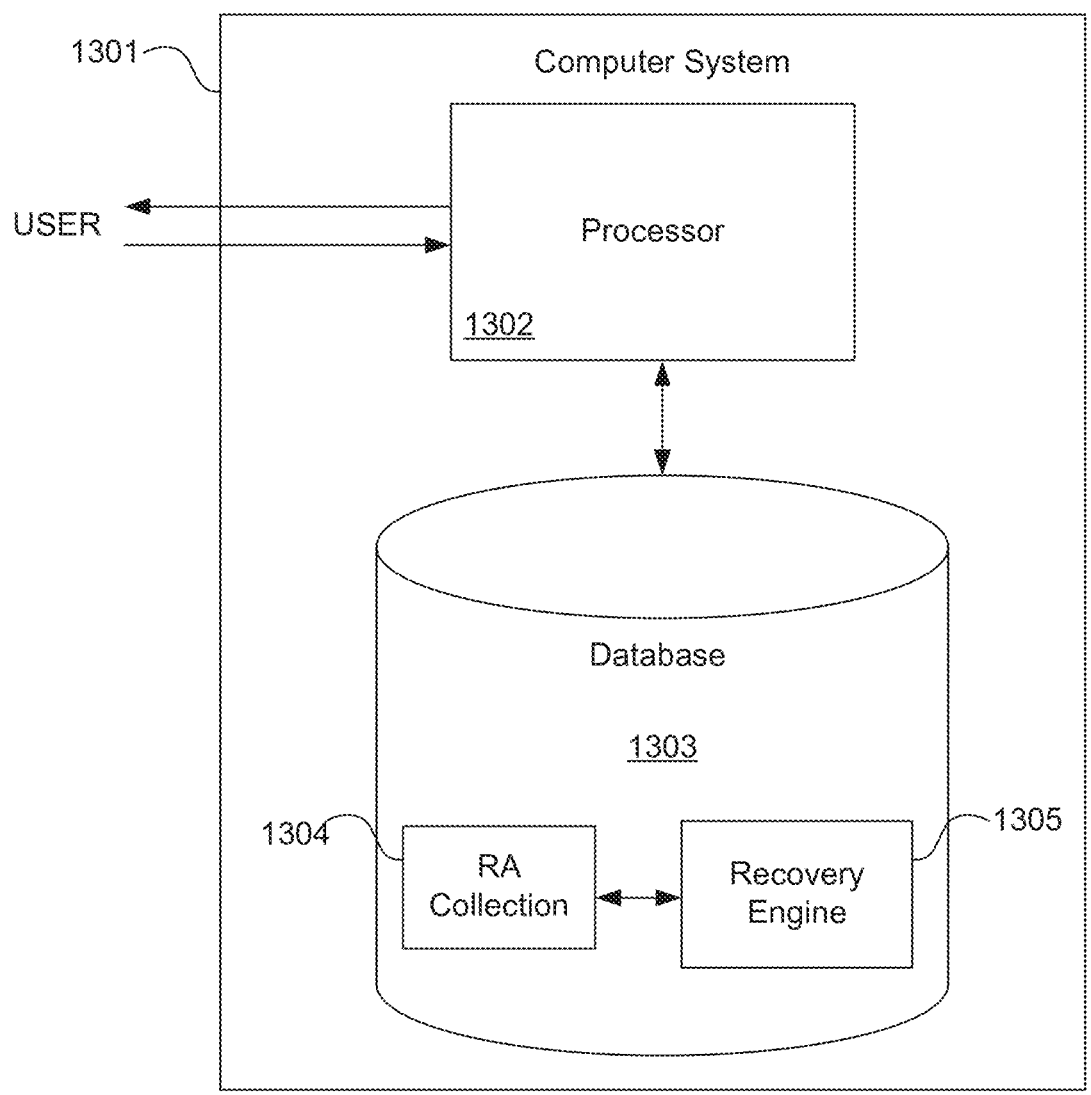
FIG. 13 illustrates hardware of a special purpose computing machine according to an embodiment that is configured to implement diagnostic activity for a cloud system.

Thus FIG. 13 illustrates hardware of a special purpose computing machine configured to implement cloud system recovery according to an embodiment. In particular, computer system 1301 comprises a processor 1302 that is in electronic communication with a non-transitory computer-readable storage medium comprising a database 1303. This computer-readable storage medium has stored thereon code 1305 corresponding to a recovery engine. Code 1304 corresponds to a recommended action. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

Figure 14:
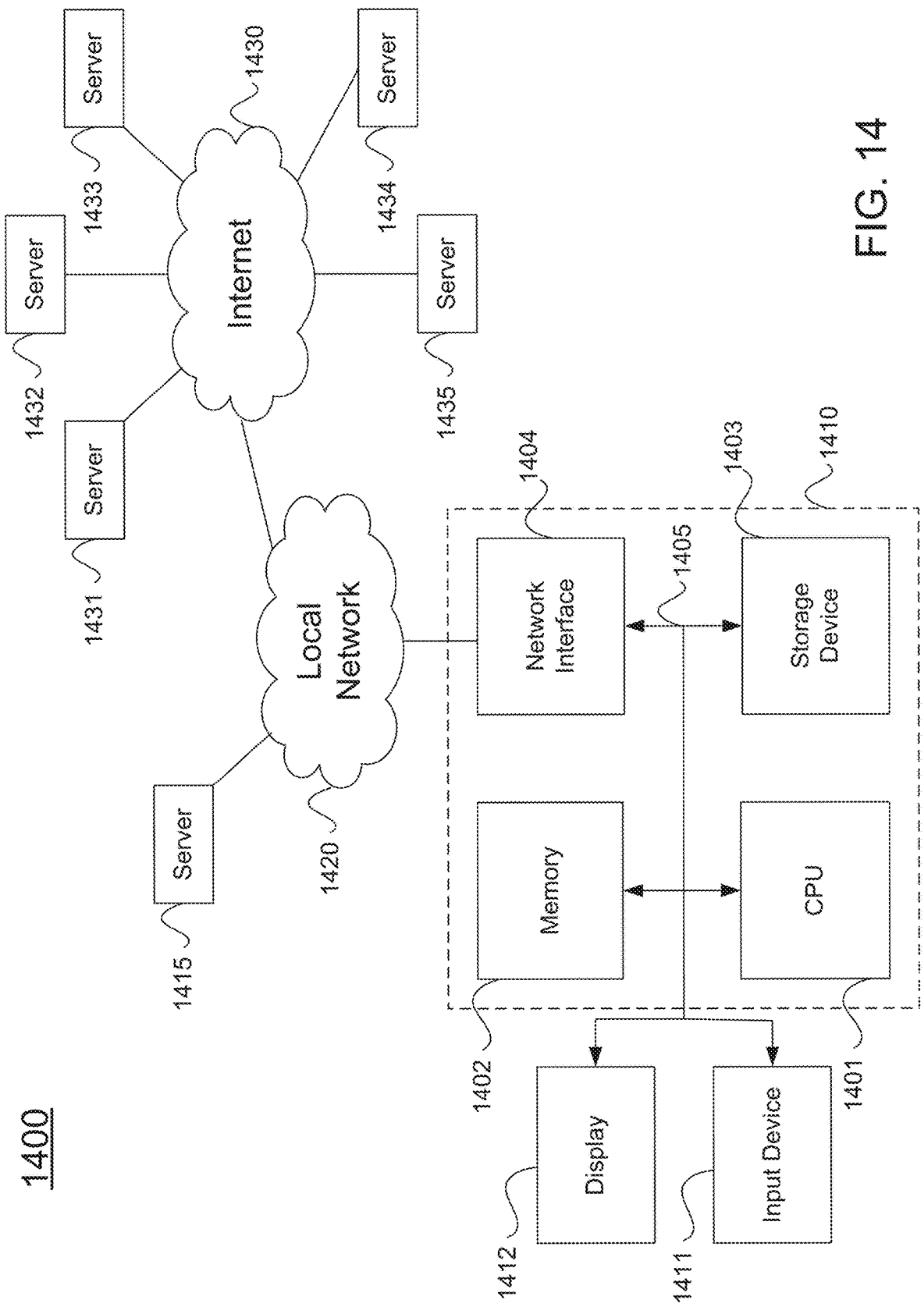
FIG. 14 illustrates an example computer system.

An example computer system 1400 is illustrated in FIG. 14. Computer system 1410 includes a bus 1405 or other communication mechanism for communicating information, and a processor 1401 coupled with bus 1405 for processing information. Computer system 1410 also includes a memory 1402 coupled to bus 1405 for storing information and instructions to be executed by processor 1401, including information and instructions for performing the techniques described above, for example. This memory may also be used for storing variables or other intermediate information during execution of instructions to be executed by processor 1401. Possible implementations of this memory may be, but are not limited to, random access memory (RAM), read only memory (ROM), or both. A storage device 1403 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 1403 may include source code, binary code, or software files for performing the techniques above, for example. Storage device and memory are both examples of computer readable mediums.

Computer system 1410 may be coupled via bus 1405 to a display 1412, such as a cathode ray tube (CRT) or liquid crystal display (LCD), for displaying information to a computer user. An input device 1411 such as a keyboard and/or mouse is coupled to bus 1405 for communicating information and command selections from the user to processor 1401. The combination of these components allows the user to communicate with the system. In some systems, bus 1405 may be divided into multiple specialized buses.

Computer system 1410 also includes a network interface 1404 coupled with bus 1405. Network interface 1404 may provide two-way data communication between computer system 1410 and the local network 1420. The network interface 1404 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 604 sends and receives electrical, electromagnetic, or optical signals that carry digital data streams representing various types of information.

Computer system 1410 can send and receive information, including messages or other interface actions, through the network interface 1404 across a local network 1420, an Intranet, or the Internet 1430. For a local network, computer system 1410 may communicate with a plurality of other computer machines, such as server 1415. Accordingly, computer system 1410 and server computer systems represented by server 1415 may form a cloud computing network, which may be programmed with processes described herein. In the Internet example, software components or services may reside on multiple different computer systems 1410 or servers 1431-1435 across the network. The processes described above may be implemented on one or more servers, for example. A server 1431 may transmit actions or messages from one component, through Internet 1430, local network 1420, and network interface 604 to a component on computer system 1410. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method comprising:
   receiving a ticket indicating an incident in a cloud system;
   processing the ticket to generate a graph including nodes corresponding to diagnostic jobs on the cloud system;
   storing the graph in a computer readable storage medium;
   executing a subset of the diagnostic jobs in parallel on the cloud system, the subset of diagnostic jobs sharing a common status in the graph;
   creating a report from analysis of execution of the subset of diagnostic jobs, the report also comprising the graph;
   storing the report in the non-transitory computer readable storage medium;
   processing the report according to a machine learning to select a recommended action from a collection, wherein the machine learning comprises a neural network, wherein processing the report comprises encoding a vector from the graph; and
   executing the recommended action upon the cloud system, wherein the recommended action is selected based upon a one-hot encoded vector output from the neural network.

2. A method as in claim 1 wherein the graph comprises a tree including a hierarchy.

3. A method as in claim 2 wherein the common status indicates job successful.

4. A method as in claim 1 further comprising training the neural network with feedback from execution of the recommended action on the cloud system.

5. A method as in claim 1 wherein:
   the non-transitory computer readable storage medium comprises an in-memory database; and
   processing of the incident ticket to generate the graph is performed by an in-memory database engine of the in-memory database.

6. A non-transitory computer readable storage medium embodying a computer program for performing a method, said method comprising:
   receiving a ticket indicating an incident in a cloud system;
   processing the ticket to generate a tree graph including nodes corresponding to diagnostic jobs on the cloud system;
   storing the tree graph in a computer readable storage medium;
   executing a subset of the diagnostic jobs in parallel on the cloud system, the subset of diagnostic jobs sharing a common status in the tree graph;
   creating a report from analysis of execution of the subset of diagnostic jobs, the report also comprising the tree graph;
   storing the report in the non-transitory computer readable storage medium;
   processing the report according to a machine learning to select a recommended action from a collection, wherein the machine learning comprises a neural network, wherein processing the report comprises encoding a vector from the tree graph; and
   executing the recommended action upon the cloud system, wherein the recommended action is selected based upon a one-hot encoded vector output from the neural network.

7. A non-transitory computer readable storage medium as in claim 6 wherein the common status indicates job successful.

8. A non-transitory computer readable storage medium as in claim 6 wherein the method further comprises training the neural network with feedback from execution of the recommended action on the cloud system.

9. A computer system comprising:
   one or more processors;
   a software program, executable on said computer system, the software program configured to cause an in-memory database engine of an in-memory source database to:
   receive a ticket indicating an incident in a cloud system;
   process the ticket to generate a graph including nodes corresponding to diagnostic jobs on the cloud system;
   store the graph in a computer readable storage medium including the in-memory database;
   execute a subset of the diagnostic jobs in parallel on the cloud system, the subset of diagnostic jobs sharing a common status in the graph;

create a report from analysis of execution of the subset of diagnostic jobs, the report also comprising the graph;
store the report in the non-transitory computer readable storage medium
process the report according to a machine learning to select a recommended action from a collection, wherein the machine learning comprises a neural network, wherein processing the report comprises encoding a vector from the graph; and
execute the recommended action upon the cloud system, wherein the recommended action is selected based upon a one-hot encoded vector output from the neural network.

10. A computer system as in claim 9 wherein the graph comprises a tree including a hierarchy.

11. A computer system as in claim 10 wherein the common status indicates job successful.

* * * * *